(12) United States Patent
Unger et al.

(10) Patent No.: US 6,742,494 B2
(45) Date of Patent: Jun. 1, 2004

(54) METHOD OF OPERATING AN INTERNAL COMBUSTION ENGINE

(75) Inventors: Eduard Unger, Leibnitz (AT); Alois Fuerhapter, Graz (AT)

(73) Assignee: AVL List GmbH, Graz (AT)

( * ) Notice: Subject to any disclaimer, the term of this patent is extended or adjusted under 35 U.S.C. 154(b) by 128 days.

(21) Appl. No.: 10/227,276

(22) Filed: Aug. 26, 2002

(65) Prior Publication Data

US 2003/0047148 A1 Mar. 13, 2003

(30) Foreign Application Priority Data

Aug. 27, 2001 (AT) .......................................... 667/2001 U

(51) Int. Cl.$^7$ ................................................. F02B 5/02
(52) U.S. Cl. ...................... 123/305; 123/435; 123/90.15
(58) Field of Search ........................... 123/90.15, 90.16, 123/90.17, 90.18, 295, 435, 305

(56) References Cited

U.S. PATENT DOCUMENTS

| 6,230,683 | B1 | 5/2001 | zur Loye et al. | ............. | 123/435 |
| 6,640,771 | B2 * | 11/2003 | Fuerhapter | ................. | 123/295 |
| 2003/0056750 | A1 * | 3/2003 | Fuerhapter | ................. | 123/295 |
| 2003/0217733 | A1 * | 11/2003 | Shiraishi et al. | ......... | 123/90.15 |

FOREIGN PATENT DOCUMENTS

| DE | 19927479 | 12/1989 |
| EP | 1085192 | 3/2001 |
| WO | 9940296 | 8/1999 |

OTHER PUBLICATIONS

T. Aoyama et al., "An Experimental Study . . . Gasoline Engine" in SAE Paper No. 960081, Detroit, Feb. 26–29, 1996.

* cited by examiner

*Primary Examiner*—Erick Solis
(74) *Attorney, Agent, or Firm*—Dykema Gossett PLLC

(57) ABSTRACT

The invention relates to a method of operating an internal combustion engine that relies for operation, in at least one operational range of the engine, on the autoignition of an at least almost homogeneous fuel-air mixture, the combustion being measured and at least one parameter for the combustion in the next cycle being set in function of a signal obtained from this measurement. In order to reduce fuel consumption and emissions and to achieve direct conversion of the load requirements, there is provided that the four cycle internal combustion engine relies for operation, in at least one second operational range, on the spark ignition of an at least almost homogeneous fuel-air mixture and that the combustion event is controlled, both in the first and in the second operational range of the engine, largely independent of the torque of the internal combustion engine.

16 Claims, 6 Drawing Sheets

METHOD OF OPERATING AN INTERNAL COMBUSTION ENGINE

BACKGROUND OF THE INVENTION

The invention relates to a method of operating an internal combustion engine, more specifically a four-cycle internal combustion engine, that relies for operation, in at least one operational range, on the autoignition of an at least almost homogeneous fuel-air mixture, the combustion being measured and at least one parameter for the combustion in the next cycle being set in function of a signal obtained from this measurement. Furthermore, the invention relates to a device for carrying out this method.

DESCRIPTION OF PRIOR ART

The combustion of an auto-ignited lean fuel-air mixture has the advantage that extremely low $NO_x$ and soot emissions are obtained on account of the homogeneous distribution of concentration and temperature. This process is known as HCCI combustion (Homogeneous Charge Compression Ignition). HCCI combustion results in low $NO_x$ emissions, which is due to the fact that combustion is initiated at multiple ignition sites, the temperature of the combustion process being relatively low as a result thereof. For HCCI combustion, gasoline presents great advantages over diesel fuel on account of its low autoignition quality and the lower boiling range of between approximately 30° C. and 190° C. The compression ratio may be raised to values similar to those in a diesel engine of about 15 to 17. Since the precise time of ignition can be fixed as desired just before top dead center only when the effective medium pressure is low, the effective medium pressure achievable in HCCI combustion is disadvantageously limited to the part load range as may be gathered from the publication entitled "An Experimental Study on Premixed-Charge Compression Ignition Gasoline Engine", Taro Aoyama et al., SAE Paper No. 960081.

DE 199 27 479 A1 describes a method for operating an engine run on gasoline in which the internal combustion engine is operated in the homogeneous charge compression ignition mode when the effective medium pressure is below a predetermined limit and in the spark ignition mode when said effective medium pressure is above said limit. In this way, all the advantages of HCCI combustion can be made use of without the disadvantages thereof.

EP 1 085 192 A2 discloses an internal combustion engine which is operated in the homogeneous charge compression ignition mode in the medium part load range and which is operated in the homogeneous charge spark ignition mode in the upper part load range and at full load, and in the lower part load range as well. In the transition range from the spark ignition mode to the compression ignition mode, the quantity of recirculated exhaust is increased in order to ensure safe autoignition. Conversely, on transitioning from the compression ignition mode to the spark ignition mode of operation, the quantity of recirculated exhaust is reduced in time to prevent knocking.

U.S. Pat. No. 6,230,683 B1 describes a diesel cycle internal combustion engine operating in a homogeneous charge mode in which the combustion process is controlled. Combustion is controlled by controlling the temperature, pressure, autoignition properties and composition of the mixture. During the intake stroke, a gaseous first fuel and a second fuel are supplied to the combustion chamber and, during an early portion of the compression stroke which is to occur between 180 and 60 degrees before top dead center, a pilot fuel is supplied to the combustion chamber. The timing of ignition of said first and second fuel is controlled by the quantity of pilot fuel.

WO 99/40296 A1 discloses a method of operating a four-cycle internal combustion engine run on a homogeneous, lean basic mixture of air and fuel and operated in the compression ignition mode in which the fuel-air ratio generated within the combustion chamber is controlled by a controllable intake element. The respective combustion event is measured and the timing of closing of the intake element is set for the next cycle in function of a signal obtained from said measurement. The engine load is controlled by the timing of closing of the exhaust element and by the residual exhaust gas within the combustion chamber, as well as by the mixture of fuel and unburned gas supplied. Combustion situation and history is sensed in real time by engine parameters such as the structure-borne noise at the internal combustion engine, the ion current in the combustion chamber and the irregularity of rotation of the crankshaft.

Generally, combustion control and torque control are performed together so that compromises must be made. Accordingly, the potential for improvements in consumption and emissions cannot be fully utilized.

Traditional engine controllers for Otto cycle engines operated with a homogeneous charge mode (both Otto cycle internal combustion engines in which injection occurs via intake manifolds and direct-injection Otto cycle internal combustion engines operated in the homogenous charge mode) substantially have the function of providing the three basic parameters, charge, injection and ignition for the respective one of the engine operating points. 8, 16 or 32-bit microcontrollers are generally utilized because they are capable of performing this function. With the help of sensor signals, they detect the actual operating condition of the engine as well as the environmental conditions and determine the optimum parameters mentioned herein above with the assistance of suited characteristic diagrams and curves. In most cases, the characteristic diagrams are addressed through the two basic operating parameters engine speed and engine load. The engine speed is determined by evaluating the signal of a speed sensor that scans a trigger disc mounted on the crankshaft. To ascertain the engine load, three different methods are generally used in principle. The one possibility consists in evaluating the signal of an air mass flow sensor positioned between air filter and throttle that senses the charge of fresh air in the engine as a result thereof. The second method consists in sensing the negative suction pipe pressure prevailing in the collecting suction pipe of the internal combustion engine, the suction pipe pressure being also indicative of the charge of the internal combustion engine. Another method provides the possibility to determine mass flow through the position of the throttle.

These methods serve to sense the load of the internal combustion engine but do not permit to take the pressure and temperature conditions in the cylinder into consideration. However, precisely these two parameters are very important when information about the combustion event or the combustion process is to be given.

Once the charge has been determined, the required mass of fuel to be injected can be determined therefrom, which permits to operate the engine at the desired air-fuel ratio $\lambda$. Deviations from this desired value $\lambda$ are sensed by a $\lambda$-sensor located in the exhaust manifold in front of the catalyst and are supplied to a control loop that corrects the deviations from the command value $\lambda$.

Furthermore, actual engine controllers are connected to a pedal valuator that detects the wish of the driver and to an electronic throttle that finally opens to let pass the air mass flow. The attractive power of the pedal valuator onto the throttle is uncoupled, i.e., there is no direct conversion of the pedal value position into a command position of the throttle, the throttle is rather driven by way of a coordination of the gathered torque requirements placed on the internal combustion engine. In this connection, an empiric torque model is mostly used, said model including the inner torque as a primary value. When the timing of ignition is optimally set, the quantity of fresh intake air in an Otto cycle engine operated in the homogeneous charge mode is directly indicative of the torque delivered.

SUMMARY OF THE INVENTION

It is the object of the invention to develop a method of operating a four-stroke internal combustion engine of the type mentioned herein above in order to achieve best possible combustion with optimum efficiency and the lowest possible fuel consumption and emissions both in the compression ignition operational range and in the spark ignition operational range.

The solution to this object in accordance with the invention is to rely for operation of the four cycle internal combustion engine in at least one second operational range on the spark ignition of an at least almost homogeneous fuel-air mixture and to control the combustion event, both in the first and in the second operational range of the engine, largely independent of the torque of the internal combustion engine. To carry out the method, the internal combustion engine is provided with a control system with two separate control loops, namely a combustion controller for monitoring the homogeneous combustion on the one side and a torque controller for converting the respective torque requirement on the other side. The combustion event in the first operational range of the engine is thereby controlled by a first fast actuator for the cylinder charge. In the first operational range of the engine the combustion is preferably stabilized on the basis of the evaluation of the combustion event in that the variables controlled are the parameters of the gas exchange valves, preferably the parameters of the injection as well. Parameters for the gas exchange valves are the timing of opening and closing and the lift for intake and exhaust. By contrast, in the first operational range of the engine, the torque is controlled by an actuator for the mass of fuel at least. It is thereby particularly advantageous when, in the first operational range of the engine, the torque is controlled considering the combustion evaluation, the variable used being primarily the mass of fuel, and preferably the parameters of the gas exchange valves as well.

For the control in the second operational range of the engine, the torque is controlled by a first and/or a second slow actuator for the cylinder charge, the first, fast actuator being preferably realized by at least one gas exchange valve and the second slow actuator preferably by an electric throttle. The second, slow actuator is particularly important at speeds near idle when the charge can no longer be correspondingly increased by way of the valve timing. In the spark ignition mode, the control at low speeds near idle thus occurs by way of the electric throttle whereas, at higher speeds in the upper part load range and at full load, the torque is at least partially controlled by the opening and/or closing of at least one gas exchange valve.

In the homogeneous spark ignition mode, the combustion control is carried out by varying the mass of fuel and/or the ignition timing.

To sense the combustion activity there is provided that the combustion is carried out by evaluating a cylinder pressure signal, an ion current signal or the signal of a light-sensitive measuring element.

The first operational range is assigned to the lower part load. The second operational range is, by contrast, assigned to the upper part load and to full load.

BRIEF DESCRIPTION OF THE DRAWINGS

The invention is explained herein after in closer detail with reference to the schematic Figs. wherein.

DETAILED DESCRIPTION OF THE PREFERRED EMBODIMENTS

Figure 1:
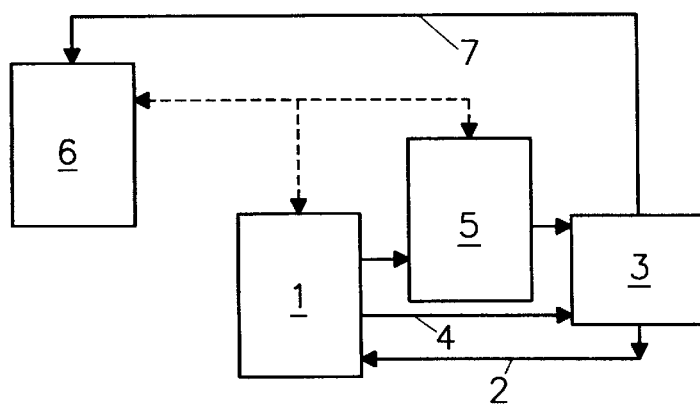
FIG. 1 shows the engine control system of the invention for the spark ignition and for the compression ignition mode.

The engine control system 1 (FIG. 1) reads all of the relevant sensor signals 2 of the internal combustion engine 3 such as engine speed n, phase synchronization signal, intake air temperature, air mass flow, throttle position, negative pressure in the intake manifold and the value $\lambda$ of the exhaust and generates all of the control signals 4 required for engine operation. The most important control signals 4 thereby are the quantity, timing and duration of injection, the actuation of the gas exchange valves, i.e., timing of opening and closing and lift height of the intake and/or exhaust valves, the ignition timing and the throttle drive. An extended embodiment may moreover include an external exhaust gas recirculation valve, an intake air preheating device, an exhaust gas retaining flap and a drive for a compressor or for an exhaust gas turbocharger, as indicated at 5. Additionally, the engine control system 1 reads, in each working cycle, the relevant combustion parameters of the last combustion event or of the last combustion events from a processing unit 6 of its own. The processing unit 6 evaluates, in real time, a combustion signal 7 such as a cylinder pressure signal $p_i$ for example. An ion current signal or a light-sensitive measuring element may be made use of instead of the cylinder pressure signal.

Figure 2:
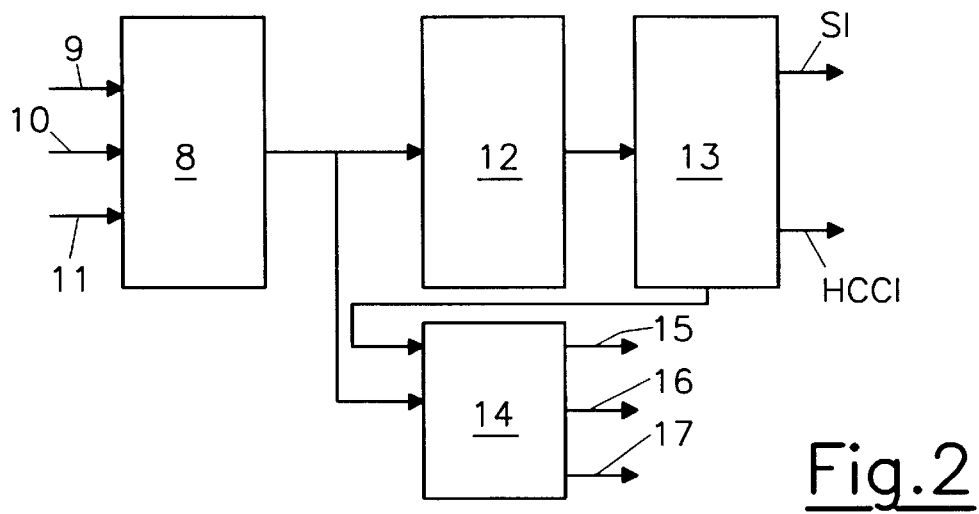
FIG. 2 shows the coordination of the torques and the division into the various operating modes.

In order to be capable of influencing the engine run or the operating mode of the engine, all the load requirements 8 such as the wish of the driver 9, the idling conditions 10, the starting requirements 11 and so on, placed on the internal combustion engine 3 are collected in a superior function as shown in FIG. 2. These collected load requirements 8 are transmitted to a selection unit 12 that chooses between the homogeneous charge spark ignition mode (SI mode) and the homogeneous charge compression ignition mode (HCCI mode). The primary decision criterion is the load requirement 8 placed on the internal combustion engine 3 since the compression ignition mode HCCI is only used in a limited speed/load range as may be surveyed from the characteristic diagram of the engine shown in FIG. 3. The mode switching logic is indicated at 13 in FIG. 2. To choose the operating mode, boundary conditions other than the load requirements 8 may be taken into consideration such as e.g., too low engine temperature and too low intake air temperature or too low exhaust gas temperature and so on. As a result thereof, the selection unit 12 generates a status information SI or HCCI that is used in all the other subordinate functions. Depending on the operating mode chosen, the torques are then converted by way of the cylinder charge, the mass of fuel and the ignition timing (mainly in the homogeneous charge operating mode).

Figure 3:
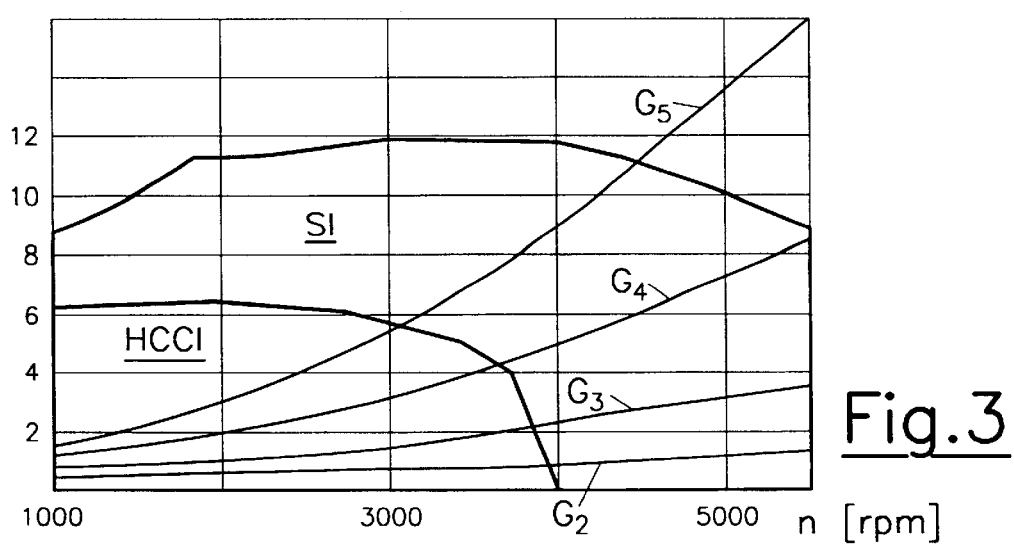
FIG. 3 shows a characteristic diagram of the engine with the various operational ranges.

In the characteristic diagram of the engine shown in FIG. 3, the indicated cylinder pressure $p_i$ is plotted down the side of the diagram, whereas rpm n is plotted on the horizontal axis. As can be seen, the internal combustion engine 3 is operated in the homogeneous charge compression ignition mode (HCCI range) at lower part load and in the homogeneous charge spark ignition mode (SI range) at upper part load and at full load. The lines $G_2$, $G_3$, $G_4$ and $G_5$ indicate the various gear ratios. In the HCCI range the internal combustion engine is operated at an air/fuel ratio $\lambda \geqq 1$, in the SI range at $\lambda \geqq 1$.

The torque conversion 14 of the load requirements 8 is carried out by varying the cylinder charge 15, the mass of fuel 16 and/or the ignition 17.

Figure 4:
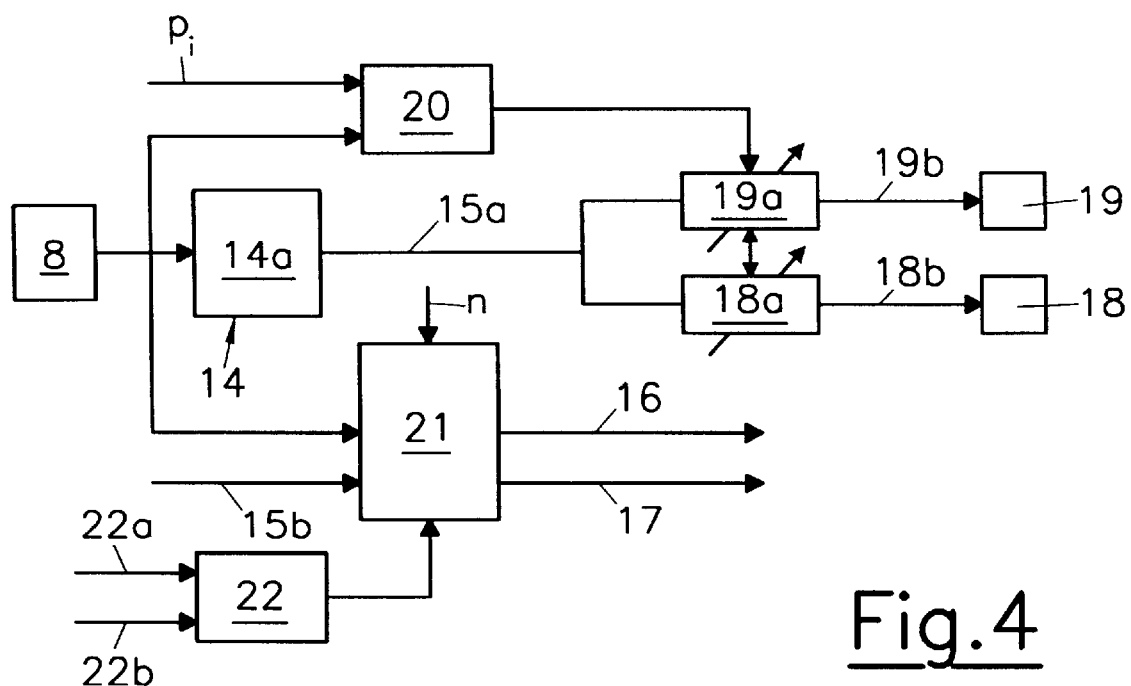
FIG. 4 shows the torque conversion and the combustion control in the homogeneous charge spark ignition mode.

FIG. 4 shows the torque conversion 14 and the combustion control 15 in the homogeneous charge spark ignition mode SI. The collected load requirement 8 is at first supplied to a torque/cylinder charge converter 14a of the torque conversion 14, which may be a characteristic diagram in the simplest case. Said characteristic diagram discloses, in function of the engine speed n and the respective load requirement 8 for example, the air mass needed to realize, at a desired stoichiometric ratio, the corresponding torque. This air mass requirement 15a is next supplied to the two control blocks 18a and 19a for a first fast actuator 18 and a second slow actuator 19, the control block 19a constituting the charge path via throttling by means of the electric throttle. Through the desired throttle requirement 19b, said path subsequently drives the throttle forming the second slow actuator 19. The control block 18a by contrast constitutes the fast charge dosage 18b through the gas exchange valve forming the second fast actuator 18. Control carried out by the second slow actuator 19 is particularly interesting at low speeds near idle when it is no longer possible to dose the charge accordingly by way of the valve timing. If now the load requirement 8 does not square with the torque generated, the cylinder charge may be adjusted by means of the torque controller 20 in such a manner that the control deviation tends to zero. Dosage and input control of the mass of fuel 16 and input control of ignition 17 are carried out by means of the processing unit 21 in function of the dependent engine speed n and the instant charge 15b.

The mixture may then be adjusted to the desired value via a constant lambda control in connection with a broad band lambda sensor. Ignition may additionally be reset by way of the homogeneous combustion controller 22 that operates on the basis of the control deviation of the instant combustion situation 22a (e.g., at 50% mass fraction burned) from the reference combustion situation 22b. It is thus possible to always adjust combustion to the thermodynamic optimum and to accordingly also enhance the efficiency in the homogeneous charge spark ignition mode of operation SI.

Figure 5:
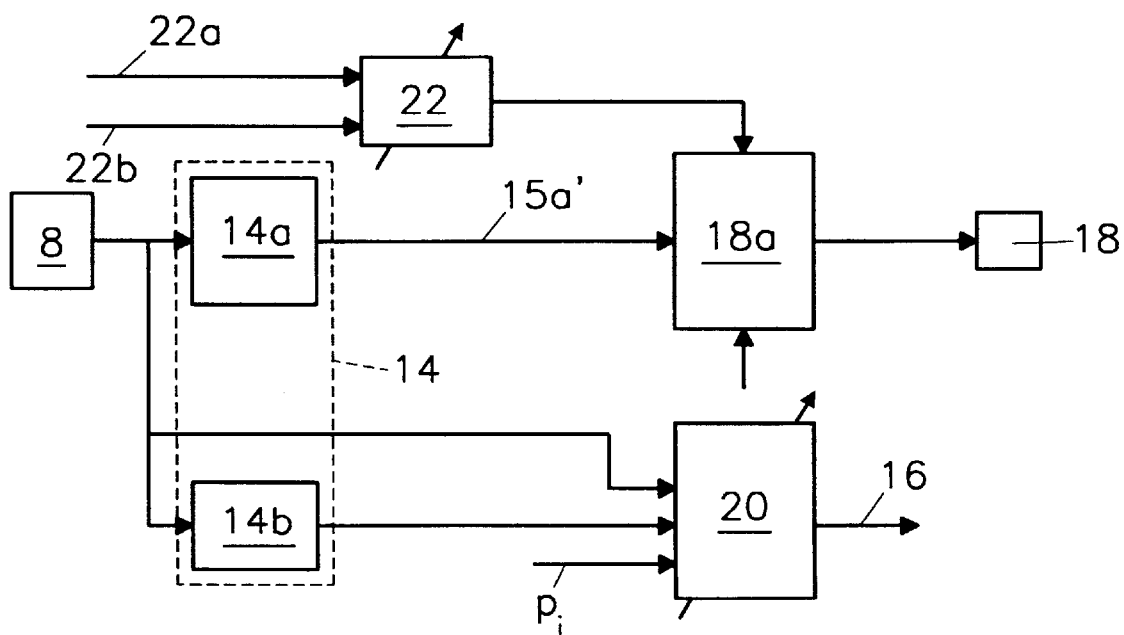
FIG. 5 shows the torque conversion and the combustion control in the homogeneous charge compression ignition mode.
Figure 6:
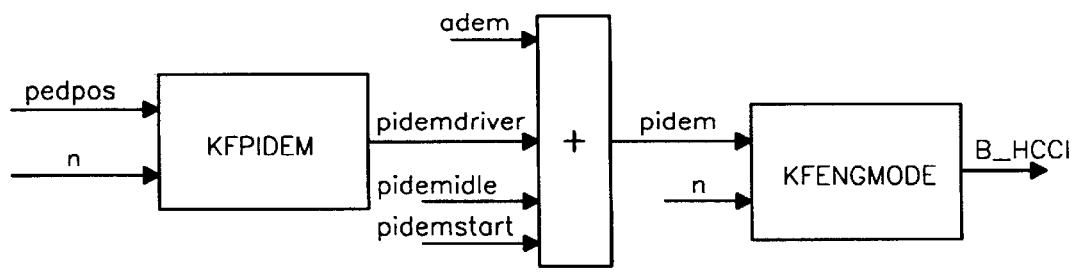
FIG. 6 is a block diagram of the torque coordination.

FIG. 5 shows the torque conversion 14 and the combustion control 22 for the homogeneous charge compression ignition mode HCCI. In a way similar to that in the homogeneous charge spark ignition mode SI, there is also provided a torque/cylinder charge converter 14a that may be configured similar to that for the homogeneous spark ignition operation SI. In the simplest case, for the respective operating point, a desired fresh intake air mass and a desired mass of exhaust gas to be recirculated may be read out of characteristic diagrams in function of the engine speed n and the desired torque. This desired cylinder charge rcdem, i.e., the combination of fresh intake air mass and mass of exhaust, is next transmitted to the control block 18a of the first fast actuator 18 that realizes the conversion of this desired cylinder charge. The first fast actuator 18 is formed by gas exchange valves. It is thereby necessary to determine the desired control parameters such as timing and duration of opening for the gas exchange valves by way of a charge model. In a way similar to that of the air path there is also a torque/fuel mass converter 14b on the fuel side. In the simplest case a mass of fuel 16 may be assigned to a desired speed/load point by way of a characteristic diagram. In a way similar to that in the homogeneous charge spark ignition mode SI, there is also provided a torque controller 20 which acts here onto the mass of fuel 16 since it is the mass of fuel 16 which is the decisive influencing parameter for the torque generated in the compression ignition mode. In the compression ignition process HCCI, the combustion controller 22, which permits stable combustion specially under the influence of disturbance variables, is very important. The combustion controller 22, which compares the instant combustion situation 22a and a reference combustion situation 22b may be configured to form a one variable controller that only acts on one parameter of valve timing or to form a multiple variables controller that simultaneously adjusts several variables of the valve drive, thus changing the composition of the charge for the future working cycles.

A simplified concrete embodiment of the HCCI engine control strategy is shown in the FIGS. 6 through 14. The torque coordination, FIG. 6, consists of three modules. The wish of the driver is read through the pedal position of the drive pedal module and is supplied to a characteristic diagram KFPIDEM that is plotted above the engine speed n and the pedal position pedpos. Said characteristic diagram KFPIDEM includes, for each operating point, a commanded torque pidemdriv, which is thereafter complemented by the torque requirement of the idle control pidemidle, the starting torque pidemstart, and possibly additional requirements adem, and so on. The sum of these torque requirements pidem is supplied to another characteristic diagram, the desired diagram of the operating modes KFENGMODE, which contains, for stationary operation, the operating mode desired to be run at the respective operating point. At the output, the status information B_HCCI that requests HCCI or SI operation is thus obtained.

Figure 7:
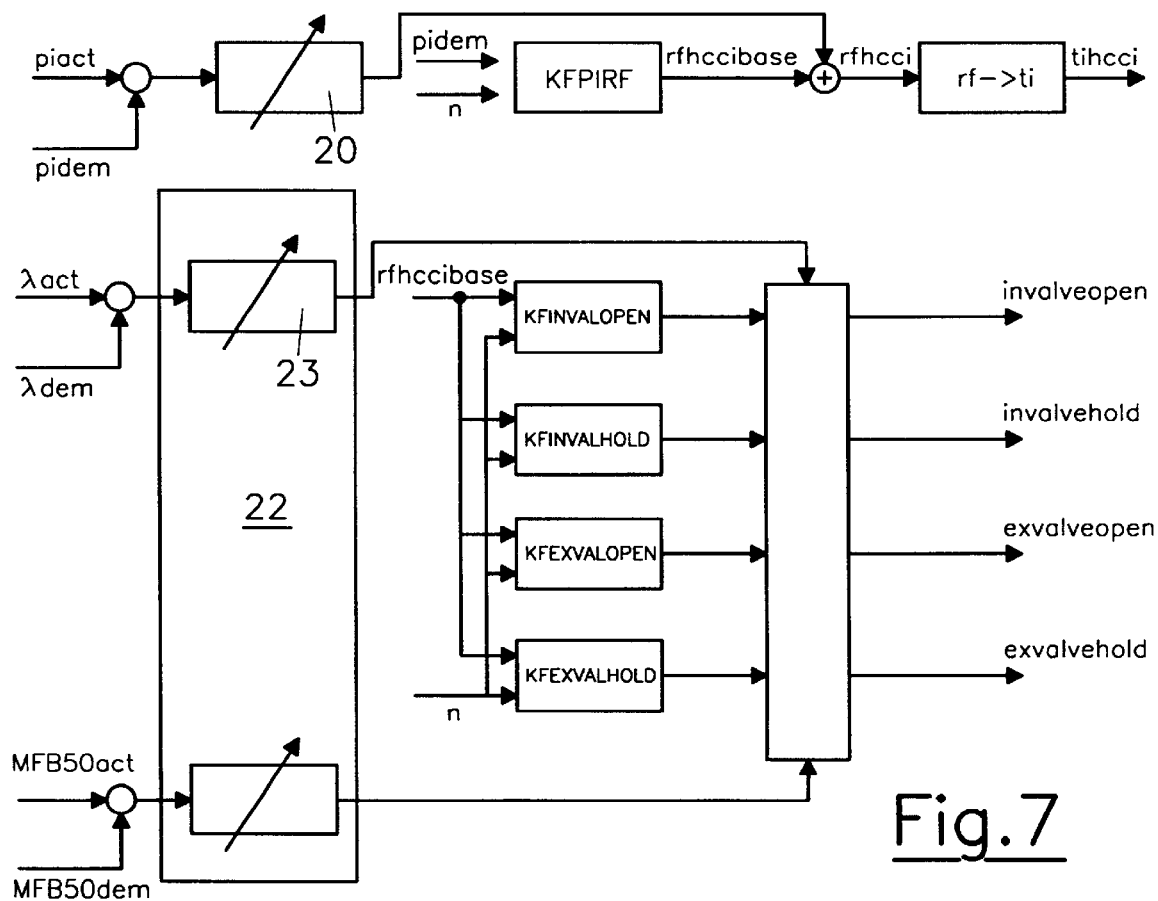
FIG. 7 is a block diagram of the combustion and load control in the compression ignition mode.
Figure 8:
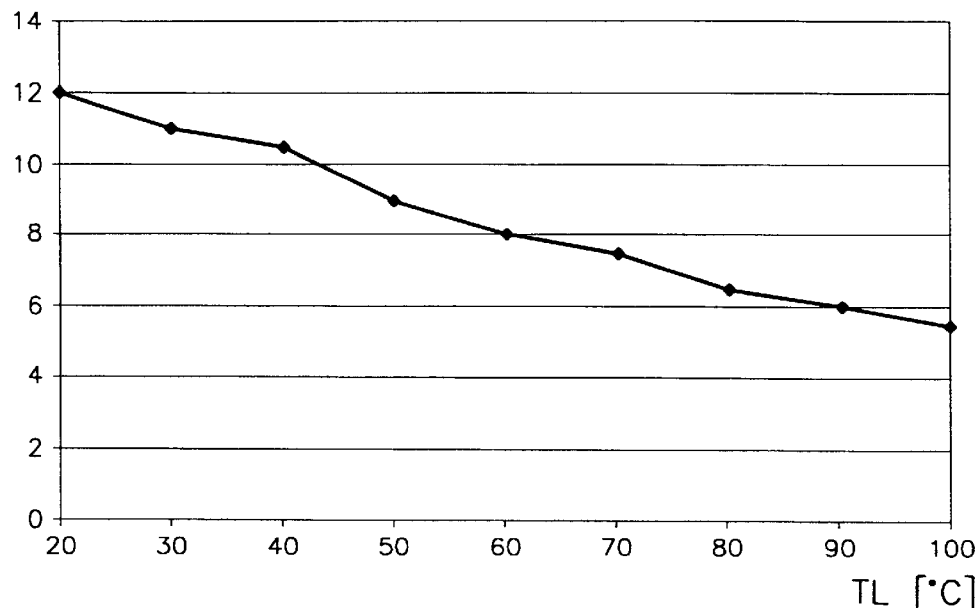
FIG. 8 shows the combustion situation as a function of the intake air temperature.
Figure 9:
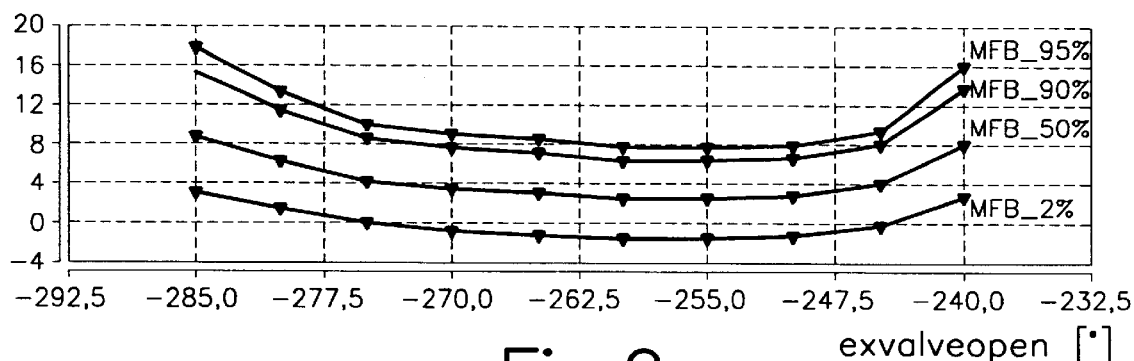
FIGS. 9–12 shows the combustion situation as a function of valve timing parameters.
Figure 10:
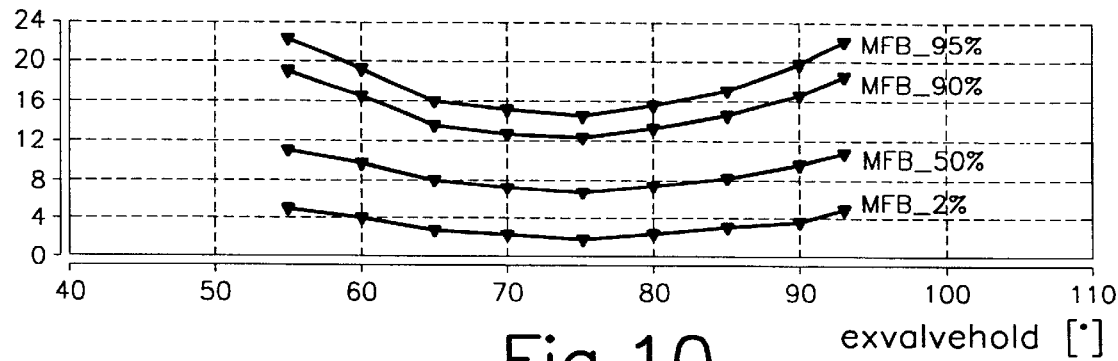
Figure 11:
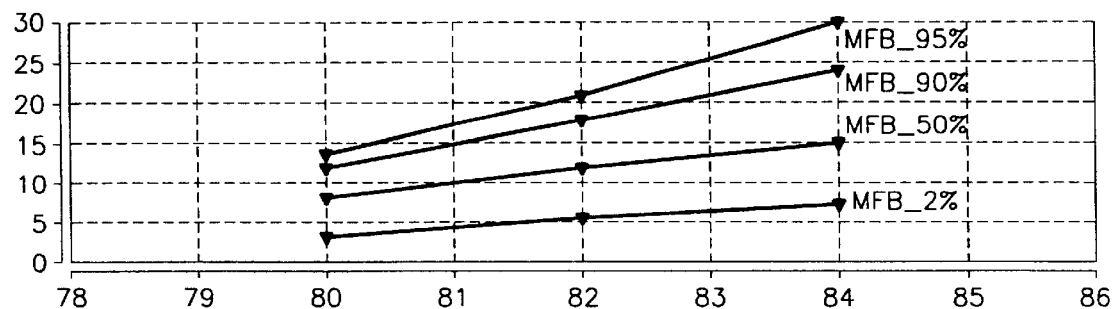
Figure 12:
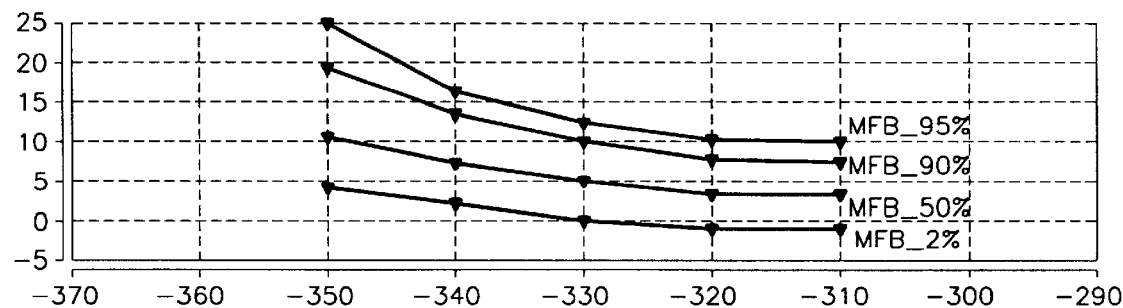
Figure 13:
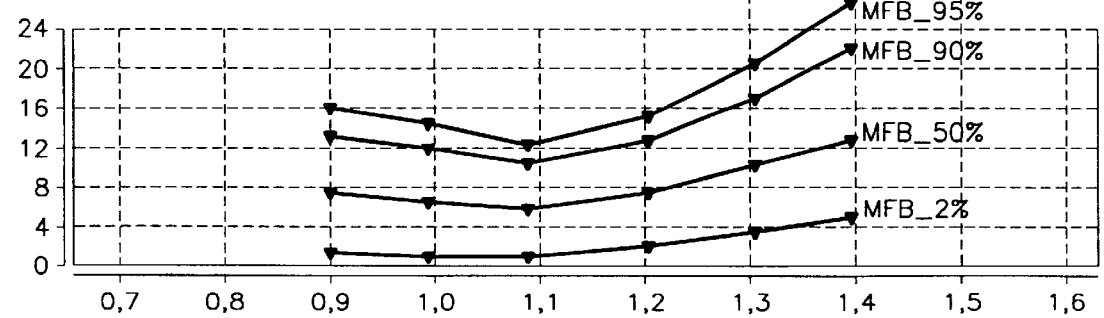
FIG. 13 shows the correlation between an exhaust value $\lambda$ and the combustion situation and FIG. 14 is a block diagram of the combustion and load control in the spark ignition mode.

For HCCI request, FIG. 7 explains how the parameters for injection and air control may be readily determined. The basic characteristic diagrams for the mass of fuel KFPIRF, the fresh intake air mass KFINVALOPEN, KFINVALHOLD and the mass of exhaust gas to be recirculated KFEXVALOPEN, KFEXVALHOLD, are obtained from a scanned measurement performed at the stationary torque stand. Under purely stationary conditions without external disturbance values affecting the operation, these pilot values permit to operate the engine in an operating point. But since the combustion process is very sensitive to a change of load point, to intake air temperature, exhaust gas temperature and so on, it is necessary to stabilize the combustion process. FIG. 8 shows by way of example the dependency of the combustion situation MFB 50%, i.e., of the 50% mass fraction burned in crank angle degrees after top dead center of ignition, on the intake air temperature TL for a constant operating point. It appears that the combustion situation MFB 50% can be decisively influenced by increasing the intake air temperature TL. Although this effect may be compensated by extending the pilot control, the last deviations must be equalized in this case as well by the combustion controller 22. Combustion may be influenced by changing the composition of the cylinder charge, which is performed by changing the valve timing parameters. The dependence of the combustion situation MFB 50% on the valve timing parameters intake valve opening invalveopen, opening duration of the intake valve invalvehold, exhaust valve opening exvalveopen and opening duration of the exhaust valve exvalvehold are compiled by way of example in the FIGS. 9 through 12. In order to obtain information about the situation of combustion, the 50% mass fraction burned is determined and compared with a reference situation in an own real time processing unit. The deviation of the actual combustion situation MFB50 act from the reference combustion situation MFB50 dem forms the control deviation for combustion controller 22 that acts directly on the valve timing parameters. Since the composition of the exhaust, which is available in the form of a measured value λact, has a decisive influence on the combustion, a lambda controller 23 is also integrated in the combustion controller 22, said lambda controller preventing the exhaust lambda from leaving the desired exhaust command lambda λdem by adjusting the mass of fresh intake air. The correlation between exhaust lambda $\lambda_A$ and the combustion situation is shown by way of example in FIG. 13. It is particularly important that the sign of the gradient of the combustion situation changes when a value λ on the order of 1.2–1 is not reached. As contrasted to the SI mode, the variable used for lambda control in the HCCI mode is not the mass of fuel but the fast air path.

To determine the mass of fuel 16 needed, a nominal mass of fuel rfhccibase is assigned to each load point by way of the characteristic diagram KFPIRF, said commanded mass of fuel being converted into an injection timing tihcci by means of an injector constant value and a rail pressure correction in step rf>ti, said injection timing being delivered to the injection valve in the form of a variable. To compensate deviations from the commanded torque pidem, a torque controller 20 operates in a multiplicative manner, influencing the mass of fuel 16.

The control deviation used is the difference between the calculated indicated mean pressure piact supplied by a processing unit of its own and the command value pidem. The controlled commanded mass of fuel is indicated at rfhcci. In the embodiment described, the throttle is always completely open in the HCCI mode of operation, the fresh intake air is throttled through the intake valve only. In a modified embodiment, it is absolutely possible to control the quantity of fresh intake air with the throttle in the HCCI mode of operation as well.

Figure 14:
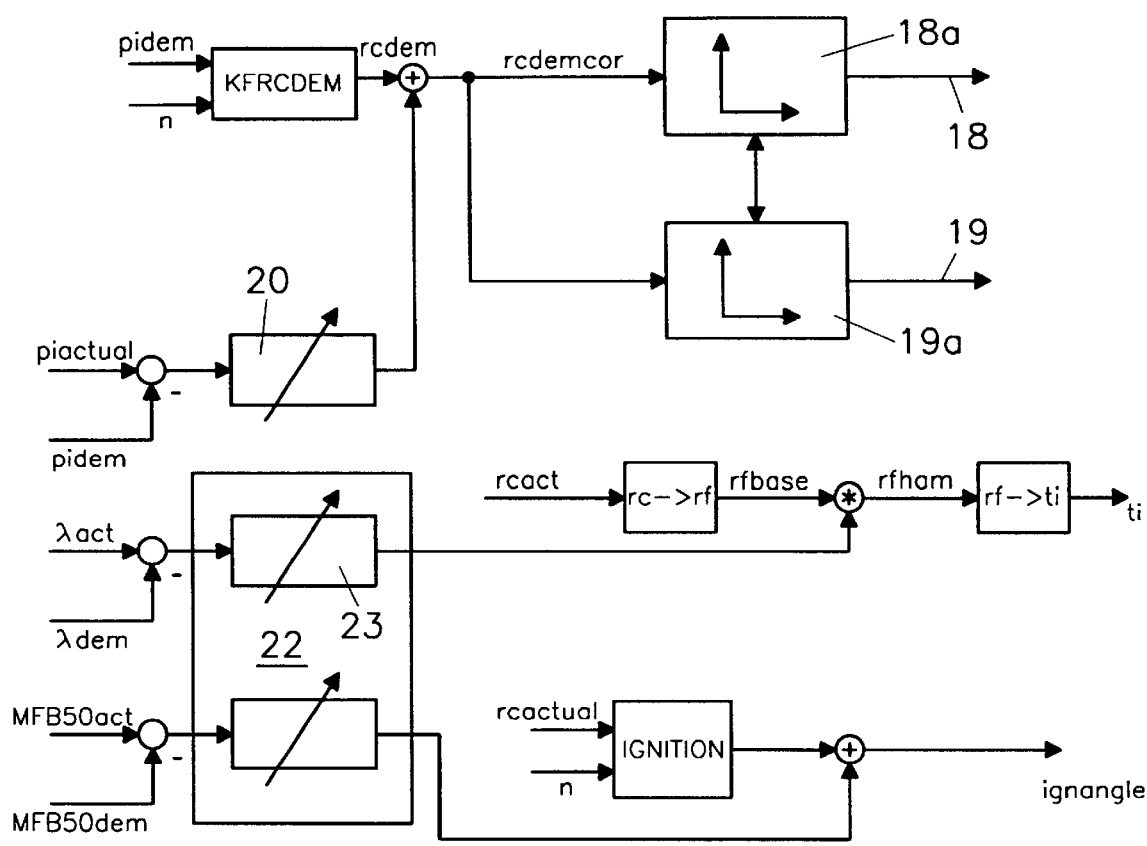

In the case of a request for the homogeneous charge spark ignition mode of operation SI, FIG. 14, a commanded air mass rcdem is assigned to each operating point by way of the characteristic diagram KFRCDEM, said commanded air mass being proportional to the desired torque pidem. Said desired charge rcdem is corrected to a desired charge rcdemcor by way of the torque controller 20, so that the desired engine torque is obtained. Conversion of the commanded charge into the valve actuating parameters may be realized by means of a charge model of the control block 18a for the variable valve drive in which the correlation between opening duration, opening timing, engine speed n and air mass passed is stored. The slow air path of the control block 19a through the throttle can be calculated by means of flow dynamic fundamental equations, said path being mainly used with very small air masses since, due to the small mass of air and the accordingly short opening durations of the gas exchange valves, problems may arise in the proportioning of the air. The proportioning of the fuel rfbase in the homogeneous charge spark ignition mode SI is carried out in conventional manner by determining the fresh intake air mass rcact and by computing the mass of fuel 16 needed by way of the stoichiometric ratio. A deviation from the commanded value λact is equalized by the lambda controller 23. The lambda controlled command value of the fuel proportioning is indicated at rfham. In step rf–>ti, the mass of fuel is converted into an injection timing ti. The combustion situation MFB 50% is pilot controlled through a characteristic diagram of the ignition angle IGNITION as a function of the engine speed n and the mass of fresh intake air rcact. The very combustion control also works with the control deviation of the 50% mass fraction burned MFB 50%, the variable used in this mode of operation being the ignition angle ignangle.

The combustion control both in the homogeneous charge spark ignition mode SI and in the homogeneous charge compression ignition mode HCCI is largely independent of the control of the torque requirement, which permits to achieve stable and optimal combustion with the least possible emissions and the best possible conversion of the torque requirements.

What is claimed is:

1. A method of operating an internal combustion engine, more specifically a four-cycle internal combustion engine, that relies for operation, in at least one operational range of the engine, on the autoignition of an at least almost homogeneous fuel-air mixture, a combustion being measured and at least one parameter for the combustion in a next cycle being set in function of a signal obtained from this measurement, wherein the internal combustion engine relies for operation, in at least one second operational range, on a spark ignition of an at least almost homogeneous fuel-air mixture and wherein the combustion event is controlled, both in the first and in the second operational range of the engine, largely independent of the torque of the internal combustion engine.

2. The method according to claim 1, wherein the combustion event in the first operational range of the engine is controlled by a first fast actuator for cylinder charge.

3. The method according to claim 1, wherein, in the first operational range of the engine, the combustion is stabilized on basis of evaluation of the combustion event in that variables controlled are parameters of gas exchange valves.

4. The method according to claim 3, wherein the variables controlled are the parameters of the injection as well.

5. The method according to claim 1, wherein, in the first operational range of the engine, torque is controlled by an actuator for mass fuel at least.

6. The method according to claim 1, wherein, in the first operational range the engine, the torque is controlled considering the combustion evaluation, the variable used being primarily the mass of fuel.

7. The method according to claim 6, wherein the variable used being the parameters of the gas exchange valves as well.

8. The method according to claim 1, wherein the combustion event in the second operational range of the engine is controlled by the actuator for the mass of fuel at least.

9. The method according to claim 1, wherein the combustion event in the second operational range of the engine is controlled by an actuator for ignition timing at least.

10. The method according to claim 1, wherein torque in the second operational range of the engine is controlled by a first fast and/or a second slow actuator for cylinder charge.

11. The method according to claim 10, wherein the first fast actuator used is at least a variably actuatable gas exchange valve.

12. The method according to claim 10, wherein the second slow actuator used is an electric throttle.

13. The method according to claim 1, wherein the combustion is measured by evaluating a cylinder pressure signal, an ion current signal or the signal of a light-sensitive measuring element.

14. The method according to claim 1, wherein the first operational range is assigned to a lower part load range.

15. The method according to claim 1, wherein the second operational range is assigned to a upper part load and to a full load range.

16. Device for carrying out the method according to claim 15 with an engine control system, wherein the engine control system is provided with a selection unit for choosing between a homogeneous charge spark ignition mode and a homogeneous charge compression ignition mode, with a torque controller for converting the respective torque requirement and with a combustion controller for monitoring homogeneous combustion, torque control and combustion control being performed largely independent of one another.

* * * * *